Z. D. BLAKISTONE.
Tobacco-Cultivators.

No. 136,898.  Patented March 18, 1873

Witnesses.
Benjamin C. Pole
Donald Stuart

Inventor.
Z. D. Blakistone
by P. Hannay
Atty.

UNITED STATES PATENT OFFICE.

ZACHARIAH D. BLAKISTONE, OF ST. MARY'S COUNTY, MARYLAND.

IMPROVEMENT IN TOBACCO-CULTIVATORS.

Specification forming part of Letters Patent No. 136,898, dated March 18, 1873.

*To all whom it may concern:*

Be it known that I, ZACHARIAH D. BLAKISTONE, of the county of St. Mary's and State of Maryland, have invented certain Improvements in Tobacco Cultivators and Weeders, of which the following is a specification, reference being had to the accompanying drawing, in which—

Figure 1:
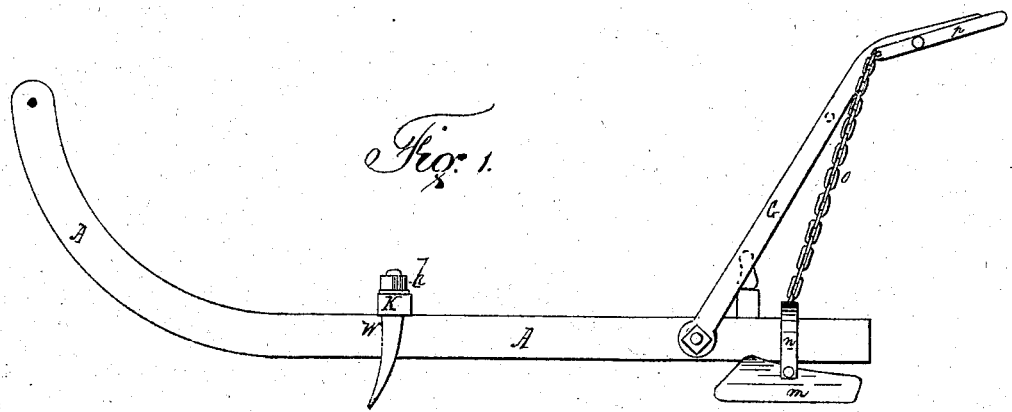
Figure 2:
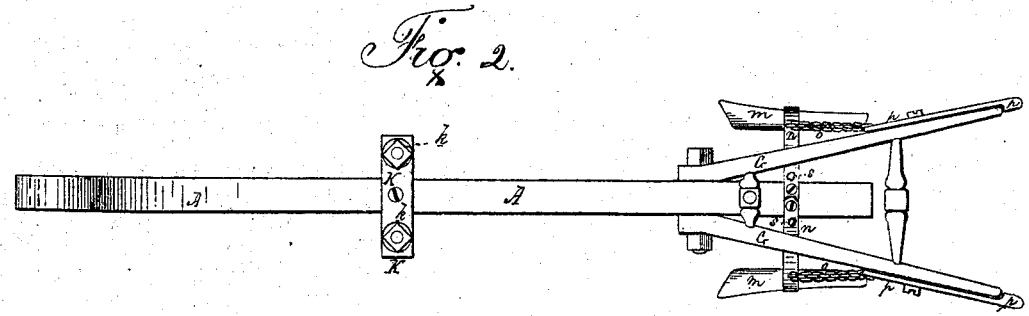

Figure 1 represents a side elevation of the improved machine as detached from the tobacco hiller and marker and adapted to the cultivation and weeding of the plants. Fig. 2 represents a plan of the same.

My invention relates to a new and improved mode of cultivating and weeding tobacco and other plants grown in hills or rows; and it consists in combining with the runner, which forms the beam to which the draft animals are attached, a pair of shovels or cultivator-teeth for the cultivation of the central part between the rows, and a pair of scrapers or weeders having a flexible and adjustable connection for the weeding of the sides of the hills or rows, whereby the adjacent sides of two rows of hills and the central space between are cultivated and weeded by a single passage of the machine between them, without cutting down the side of either of the rows, as is more or less the case with other machines. It also consists in the adaptation of a device to the weeders and scrapers, whereby, in conjunction with their elastic and flexible connection to the beam or runner, they can be raised or lowered to lessen or increase their depth of penetration or to withdraw them entirely, as may be desired.

To enable others skilled in the art to make, construct, and use my improvement, I will now proceed to describe its parts in detail.

The beam or runner A is curved upward in front to a height sufficient to form a suitable attachment for the draft animals at or near the line of draft, and which may be effected in the usual manner by means of a clevis. At or near the rear end of the runner is secured, in any well-known manner, a pair of handles, G, for the guidance and management of the machine. Between the handles and the raised or curved portion of the runner A is secured a short cross-beam, K, either by a strong screw-bolt or by any other suitable device. In each end of this cross-beam a shovel or cultivator-tooth, W, is fastened by means of a screw-nut, $k$, they being provided with a shank having a screw cut on their upper end for the purpose. This done, attach immediately in the rear of the handles G a pair of spiral scrapers, $m$, to the runner A. For this purpose each blade is provided with a curved spring-arm, $n$, having a series of bolt-holes, $s$, on its inner end, by means of which it is not only fastened to the beam, but adjusted out and in, to adapt it to the width of row required. These arms $n$ are curved and made of steel to enable them to yield to lateral pressure and to be raised or lowered in order to adjust their depth of penetration, or to withdraw them entirely from the soil, so as to skip irregular plants, &c. For the purpose of raising these blades hand-levers $p$ may be pivoted to the side of the handles G and attached at their lower end to a connecting rod, cord, or chain $o$, the other end of which is connected to the arm $n$, so that by depressing the outer end of the levers $p$ the blades will be raised, and vice versa when released, as they will descend by virtue of their own gravity and reaction of springs $n$. Each can be raised independently of the other, as occasion may require, or both together.

The blades $m$ may be made of any suitable material, but I prefer to make them of thin sheets of steel or iron edged with steel; but they may be made of cast-iron. They are four-sided, nearly twice as long as they are wide, somewhat rhomboidal in form, two-edged, and reversible, so as to be capable of being changed end for end, and are curved and spirally twisted and inclined toward the shaft A at their rear end.

Having described my invention, I claim—

1. A runner, A, when provided with a pair of cultivating implements, W, in front, and a pair of adjustable cutting or weeding blades, $m$, constructed and arranged as described, for the purpose set forth.

2. The weeding-blades $m$, when connected to the runner A by means of a curved spring-arm, $n$, for the purpose set forth.

3. In combination with the weeders $m$ and curved spring-arm $n$, the lever $p$ and connecting rod or chain $o$, for the purpose set forth.

Z. D. BLAKISTONE.

Witnesses:
P. HANNAY,
D. STUART.